No. 11,878.

Reissued Dec. 18, 1900.

H. M. LARTER.

BUTTON OR STUD.

(Application filed Feb. 1, 1899.)

WITNESSES:

A. R. Krousse.

Russell M. Everett.

INVENTOR

Halsey M. Larter.

BY

Drake & Co.

ATTORNEYS

THE NORRIS PETERS CO., PHOTO-LITHO., WASHINGTON, D. C.

UNITED STATES PATENT OFFICE.

HALSEY M. LARTER, OF NEWARK, NEW JERSEY, ASSIGNOR OF TWO-THIRDS TO FREDERICK H. LARTER AND HARRY C. LARTER, OF SAME PLACE.

BUTTON OR STUD.

SPECIFICATION forming part of Reissued Letters Patent No. 11,878, dated December 18, 1900.

Original No. 616,057, dated December 13, 1898. Application for reissue filed February 1, 1899. Serial No. 704,196.

*To all whom it may concern:*

Be it known that I, HALSEY M. LARTER, a citizen of the United States, residing at Newark, in the county of Essex and State of New Jersey, have invented certain new and useful Improvements in Buttons or Studs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to secure increased strength in the button whereby the post thereof can be forced into position in the shirt eyelet-hole with less danger of breakage, to enable said post to be thrust in such position with greater ease, to facilitate manufacture and reduce the cost of construction, to secure a more sightly stucture, to enable the cross-head forming the inner part or base of the post to be more nearly centralized in its relation to the upper part of said post, so that the button when employed with long buttonholes as distinguished from mere eyelets in the shirt-front will not be so apt to draw out, and thus unbutton the shirt, and to secure other advantages and results, some of which may be referred to hereinafter in connection with the description of the working parts.

The invention consists in the improved stud or button for personal wear and in the arrangements and combinations of parts of the same, all substantially as will be hereinafter set forth, and finally embraced in the clauses of the claim.

Figure 1:
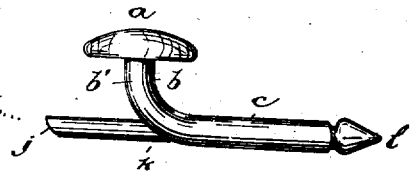
Figure 2:
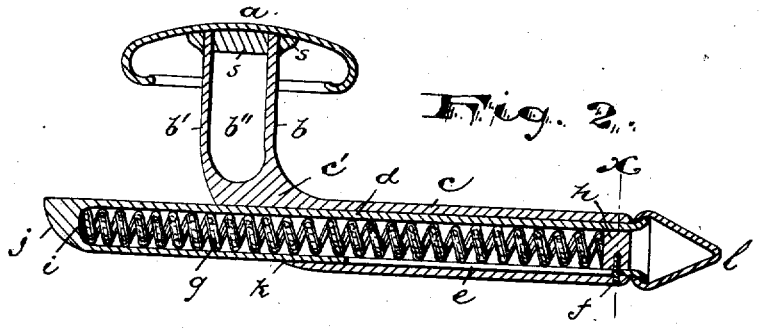
Figure 3:
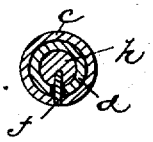
Figure 4:
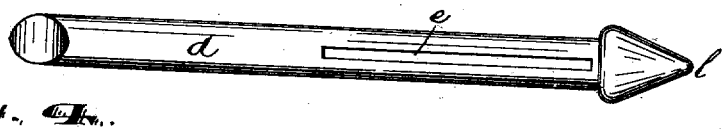

Referring to the accompanying drawings, in which like letters of reference indicate corresponding parts in each of the several figures, Figure 1 is a side elevation of the improved stud or button. Fig. 2 is an enlarged sectional detail showing the construction of the post and its cross-head more clearly. Fig. 3 is a transverse section taken on line $x$ of Fig. 2, and Fig. 4 is a detail view of a certain sliding plunger.

In said drawings, $a$ indicates the ornamental or outer head of the button of any suitable and appropriate construction and design. $b$ indicates the post, fastened to said head by solder $s$ or other suitable means, and $c$ the barrel of said post, which lies perpendicular to the upper part of said post and forms part of the cross-head. In said barrel is arranged the plunger $d$. Said plunger normally projects lengthwise of the barrel out therefrom to complete the cross-head, by means of which the said button is prevented from being withdraw from the garment.

Heretofore in the class of buttons to which this invention relates the post has been formed of independent pieces of hollow wire soldered together at the angle in some cases and in other cases of a single piece of hollow wire bent at a right angle. In both of these cases the metal at the angle has been considerably and materially reduced in strength to permit of the outpassage of the plunger, and as a result the barrel has frequently become bent from a proper right angular or perpendicular relation to the outer part of the post or become detached and broken. In the present case I form the metal at said angle of solid wire, so as to secure greater solidity and the increased strength desired. With this end in view I form the post and barrel of a single piece of solid wire, which is bent at right angles, so that the shank $b'$ of the post $b$ and the barrel $c$ will be perpendicular in their relations to one another. I then bore out the post, as shown at $b''$, so as to save metal, the boring, however, not extending to the spring-chamber formed in the barrel $c$, the metal at the angle remaining unbored, as at $c'$, to effect a strong jointless brace or strengthening-support. The said bent solid wire of the post is also bored lengthwise of the barrel to form a passage or receptacle for the plunger $d$. The bore extends from the projecting end of the barrel out through the bent metal at the angle and below the integral brace $c'$. The plunger $d$ is slotted longitudinally, as at $e$, to receive a guide and stop-pin $f$, hereinafter referred to. Within said barrel is arranged the said plunger $d$, which is a tube adapted to receive the spring $g$, the said spring being arranged within the said plunger $d$, so as to permit of a longer spring being employed than is permitted by arrangements heretofore employed and permitting a greater length of movement of the plunger being secured whereby the end of the plunger projecting from the post at the angle or bend will have a longer extension outside of said barrel to bring the cross-head as a whole into a more central relation to the shank. Said plunger *d* is prevented from turning in its receptacle by means of the pin *f*, which extends through a small perforation therefor in the barrel *c*, through said slot *e*, into a block *h* within the said plunger *d*, the said block serving in said plunger as an end bearing for the spring. The opposite end of the plunger from that having the block *h* is provided interiorly with a bearing *i* for the spring *g*, said bearing being formed by filling in the tube or by applying thereto an end piece. The said plunger at its extremity adjacent to said bearing *i* is beveled or curved, as at *j*, the bevel or curve conforming to the curve or turn *k* in the post, and inasmuch as the said plunger cannot turn within said barrel the said bevel or curve *j* may be made to extend from the top of the plunger to the bottom, and I can secure a complete withdrawal of the plunger within the barrel and a better coincidence of the surfaces *j k* with less movement of said plunger than if the said plunger were free to turn axially in the barrel. The post and barrel being of one integral piece and continuous at the angle present no joints, enlargements, or shoulders to view, such as would tend to mar the appearance of the stud or obstruct or impede the withdrawal through the closely-fitting eyelet or buttonhole.

The plunger, at its end opposite the beveled end, is provided with a finger-piece *l*, which is conical or pointed at its extremity to permit of its being thrust through the buttonhole with ease. The conical finger-piece *l* is preferably in the form of a hollow cap, which is curled over a flaring or enlarged extremity of the hollow wire plunger. Said conical cap forms a shoulder which engages the extremity of the barrel to limit the movement of the plunger under the force of the spring, although the pin connecting the barrel with the interior spring may serve the same purpose in connection with the end wall of the slot.

To place the button in position in the garment, the barrel is thrust through the buttonhole or eyelet, the conical head facilitating the work of insertion. The said conical head is then grasped on the under side of the garment and the plunger is drawn longitudinally within the barrel to its limit of movement. The drawing power is then brought to bear upon said barrel, and the latter is drawn forward to the bend of the post, when a turn in the direction of draft is given and the shank enters through the said buttonhole or eyelet, so that the beveled end of the plunger lies on the under side of the garment. The conical cap or finger piece is then released and the spring exerts its power to force the plunger to its normal position, as shown in Fig. 2, so that the button is locked within the garment, as will be understood.

Having thus described the invention, what I claim as new is—

1. The improved button herein described, comprising the head *a*, bent post *b*, having a shank *b'* and a barrel *c*, said post being formed of a piece of wire bent at right angles and at one end attached to said head *a*, and at the opposite end forming a barrel open at said end and at the angle or bend, a pin *f*, a tubular plunger arranged in said barrel, and projecting out therefrom at its opposite ends, one end of said plunger being rounded in conformity to the bend in the wire and the opposite end being peripherally outwardly turned to receive and hold a conical finger-piece, said plunger being interiorly hollow to form a spring-chamber and longitudinally slotted to receive the pin *f*, a finger-piece *l*, secured upon the end of the plunger opposite the rounded end, and a spring arranged within the plunger and tending to hold the rounded end of the plunger out from the bend in the wire, substantially as set forth.

2. The improved button or stud herein described, comprising a head, a wire bent at right angles to form a shank and barrel, the barrel having a hollow and slotted plunger extending therethrough and projecting out therefrom at both the angle and free end of the barrel, a spring lying within said plunger, and a pin on the barrel extending into said slot, said parts being arranged and combined, substantially as set forth.

3. The improved stud or button herein described comprising a head, a wire bent at right angles to form a shank and barrel, the barrel having a pin, a hollow and slotted plunger extending therethrough and projecting out therefrom at both the angle and free end, the projecting part near said free end flaring or being turned outwardly, and a hollow or cap-like finger-piece, the edges of which are inwardly turned to engage the outwardly-turned part, and a spring arranged within said plunger, substantially as set forth.

4. The improved stud or button herein described comprising a head, a wire attached to said head and bent at a right angle to form a shank and barrel, the barrel portion being hollow and open at the angle and free end and being provided with a pin at or near said free end adapted to limit the longitudinal movement of the plunger and prevent its turning axially, a slotted plunger arranged within said barrel, and having a beveled or curved extremity corresponding to the outline of the bent wire and projecting from said barrel at the angle in the wire and having a finger-piece attached to the projecting end opposite the beveled or curved end, means preventing said plunger from turning in the barrel, and a spring, all said parts being arranged and adapted to operate, substantially as set forth.

5. The improved stud or button herein described, comprising a head, a wire attached to said head bent at right angles to form a shank and barrel, said barrel being open both at the right angle where it connects with the shank and at its opposite end and at the latter being provided with a spring-bearing, a tubular plunger projecting out from said opening at the angle and at its projecting end being closed to form an interior spring-bearing, said tubular plunger having a finger-piece whereby it may be drawn into the barrel at the angle, and a spring arranged in said projecting part of the plunger and extending from the interior spring-bearing to the spring-bearing of the barrel, substantially as set forth.

6. The improved button comprising a head, a post attached to said head and bent at a point back from said head and forming a shank and barrel, the latter of which lies perpendicular to the said shank, the said barrel forming a part of a rear cross-head and providing a receptacle for the hollow or tubular plunger *d*, which receptacle is open at the angle or bend in the post and at the projecting end thereof, the said projecting end of the barrel having an end bearing for a spring, said hollow or tubular plunger being adapted to slide in said barrel and normally projecting out from the opening at the bend in the post, to complete the cross-head, said plunger having a finger-piece lying at the outside of the open projecting end of the barrel, the said plunger, both where it lies within the barrel and out from the bend-opening, being chambered to receive a spring and within its end normally projecting out from the bend-opening having a bearing *i*, for the spring, and said spring extending through the chamber within the plunger from said bearing *i*, to the end bearing at the projecting end of the barrel, whereby a long spring is employed and an ample length of movement of the plunger and a greater projection of the same normally out from the bend in the post is obtained, substantially as set forth.

In testimony that I claim the foregoing I have hereunto set my hand this 4th day of January, 1899.

HALSEY M. LARTER.

Witnesses:
CHARLES H. PELL,
RUSSELL M. EVERETT.